United States Patent
Münster

(10) Patent No.: US 7,500,686 B2
(45) Date of Patent: Mar. 10, 2009

(54) CHASSIS ARRANGEMENT FOR A VEHICLE

(75) Inventor: Martin Münster, Wilhelmsdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 525 days.

(21) Appl. No.: 11/039,021

(22) Filed: Jan. 20, 2005

(65) Prior Publication Data

US 2005/0167932 A1 Aug. 4, 2005

(30) Foreign Application Priority Data

Jan. 29, 2004 (DE) .................. 10 2004 004 335

(51) Int. Cl.
*B60G 21/055* (2006.01)

(52) U.S. Cl. ............................. 280/124.107; 280/5.502

(58) Field of Classification Search .......... 280/124.106, 280/124.107, 6.15, 5.502

See application file for complete search history.

(56) References Cited

U.S. PATENT DOCUMENTS

| | | | | |
|---|---|---|---|---|
| 2,113,071 | A | * | 4/1938 | Allen .......................... 267/194 |
| 2,133,773 | A | * | 10/1938 | Rossman et al. .............. 267/183 |
| 5,794,966 | A | * | 8/1998 | MacLeod .................. 280/5.507 |
| 6,022,030 | A | * | 2/2000 | Fehring ..................... 280/5.511 |
| 6,149,166 | A | * | 11/2000 | Struss et al. ................ 280/5.511 |
| 6,318,737 | B1 | * | 11/2001 | Marechal et al. ........... 280/5.511 |
| 6,425,585 | B1 | | 7/2002 | Schuelke et al. |
| 6,439,583 | B1 | * | 8/2002 | Markowetz ............... 280/5.511 |
| 6,550,788 | B2 | * | 4/2003 | Schmidt et al. ............ 280/5.511 |
| 6,698,767 | B2 | * | 3/2004 | Hagan ...................... 280/5.511 |
| 6,805,361 | B2 | * | 10/2004 | Germano et al. ........... 280/5.511 |
| 6,811,166 | B2 | * | 11/2004 | Carlstedt et al. ......... 280/124.152 |
| 6,951,341 | B1 | * | 10/2005 | Beetz et al. ............... 280/5.511 |
| 7,080,843 | B2 | * | 7/2006 | Heo ......................... 280/5.508 |
| 7,134,672 | B2 | * | 11/2006 | Beishline et al. .......... 280/5.502 |
| 2003/0122329 | A1 | * | 7/2003 | Lin et al. .................. 280/6.15 |
| 2004/0169346 | A1 | * | 9/2004 | Ersoy et al. ............ 280/124.107 |
| 2004/0195796 | A1 | * | 10/2004 | Heo ...................... 280/124.106 |
| 2004/0217560 | A1 | * | 11/2004 | Heller et al. .............. 280/5.502 |
| 2005/0029722 | A1 | * | 2/2005 | Reichel et al. .............. 267/188 |
| 2005/0167932 | A1 | * | 8/2005 | Munster ................... 280/6.15 |
| 2007/0108707 | A1 | * | 5/2007 | Kobayashi ............... 280/5.511 |

FOREIGN PATENT DOCUMENTS

DE 37 34 698 A1 7/1988

(Continued)

*Primary Examiner*—Eric Culbreth
*Assistant Examiner*—Karen Amores
(74) *Attorney, Agent, or Firm*—Davis & Bujold, P.L.L.C.

(57) ABSTRACT

A chassis arrangement for a vehicle having one left stabilizer half (5) for tying to a left gear guide of an axle, one right stabilizer half (9) for tying to a right gear guide of the axle and one actuator (10) for swinging the stabilizer halves (5, 9), the actuator (10) having one housing (11) connectable or connected with the vehicle superstructure (2); one left input unit (15) for swinging the left stabilizer half (5) relative to the housing (11); one right input unit (19) for swinging the right stabilizer half (9) relative to the housing (11); and one clutch arrangement (12, 23, 33) for blocking the input units (16, 19). By adequate control of the input units (15, 19) and clutch arrangement (12, 23, 33), an active stabilizer position, a passive stabilizer position and a level regulating or pitch compensating position are adjusted by lifting the axle.

13 Claims, 1 Drawing Sheet

FOREIGN PATENT DOCUMENTS

| | | |
|---|---|---|
| DE | 39 28 062 A1 | 11/1990 |
| DE | 198 46 275 A1 | 12/1999 |
| DE | 195 50 169 C1 | 7/2000 |
| DE | 102 25 296 A1 | 12/2003 |
| DE | 102 42 552 A1 | 3/2004 |
| JP | 02270617 A * | 11/1990 |
| WO | 03/045719 * | 6/2003 |
| WO | WO-03/045719 A1 | 6/2003 |

* cited by examiner

CHASSIS ARRANGEMENT FOR A VEHICLE

This application claims priority from German Application Serial No. DE 10 2004 004 335.3 filed Jan. 29, 2004.

FIELD OF THE INVENTION

The invention relates to a chassis arrangement for a vehicle and to a method for operating such a chassis arrangement.

BACKGROUND OF THE INVENTION

A chassis arrangement of that kind has on, at least one axle, one stabilizer situated between two stabilizer halves for compensation of a tendency of the vehicle to reel due to a transverse acceleration occurring during cornering. As a rule, both vehicle axles are equipped with active stabilizers and axially form reaction torques opposite to the reeling torque for compensating for the reeling movements.

Fully active suspension systems have separate actuators which act directly on the suspensions or the guides of all gears. Thereby those fully active suspension systems, in addition to the reeling compensation, make pitch compensation possible in which one axle is lifted or lowered. The expense in apparatus is of course considerably higher compared to active stabilizers.

WO 03/045719 A1 has also disclosed a vehicle stabilizer having two symmetrically disposed spur gear drives.

With this background, the problem on which the invention is based is to make both reeling compensation and change of level possible at relatively low technical expense and in compact design.

SUMMARY OF THE INVENTION

The basic idea of the invention is that by situating an actuator between the stabilizer halves, in addition to the active stabilizer function, a level regulation can be implemented by providing two input units and one adequate clutch arrangement. The input units can preferably have the same structure, in particular, mirror symmetrical equal construction, whereby symmetrical dynamics and low production costs are achieved. As clutches of the clutch arrangement, any electrically connectable clutches or switches can be used.

The inventive actuator is of a longer shape than a conventional active stabilizer only in the axial direction; in the critical radial direction, according to installation space, it needs basically no more installation space than a conventional active stabilizer.

According to the invention, an active stabilizer position, a passive stabilizer position and a level regulating position can optionally be adjusted. The adjustment can be effected by a control device of the dynamic regulation depending on a driving mode detected by sensors.

The housing of the actuator can be advantageously uncoupled from the superstructure of the vehicle so that it is possible, during leveling regulation, to produce the non-rotatable connection for torque support in the vehicle superstructure, the same as during a mere reeling compensation function to make available, by uncoupling from the vehicle superstructure, the full spring length of the stabilizer. This possible uncoupling of the actuator from the vehicle superstructure further makes a stabilizer-dependent lifting suspension for comfort increase possible and unhindered movement of the stabilizer rear during reeling movements or reeling compensation. But also basic is a design having one housing fixedly connected with the vehicle superstructure.

BRIEF DESCRIPTION OF THE DRAWING

The invention will now be described, by way of example, with reference to the accompanying drawings in which.

DETAILED DESCRIPTION OF THE INVENTION

Figure 1:
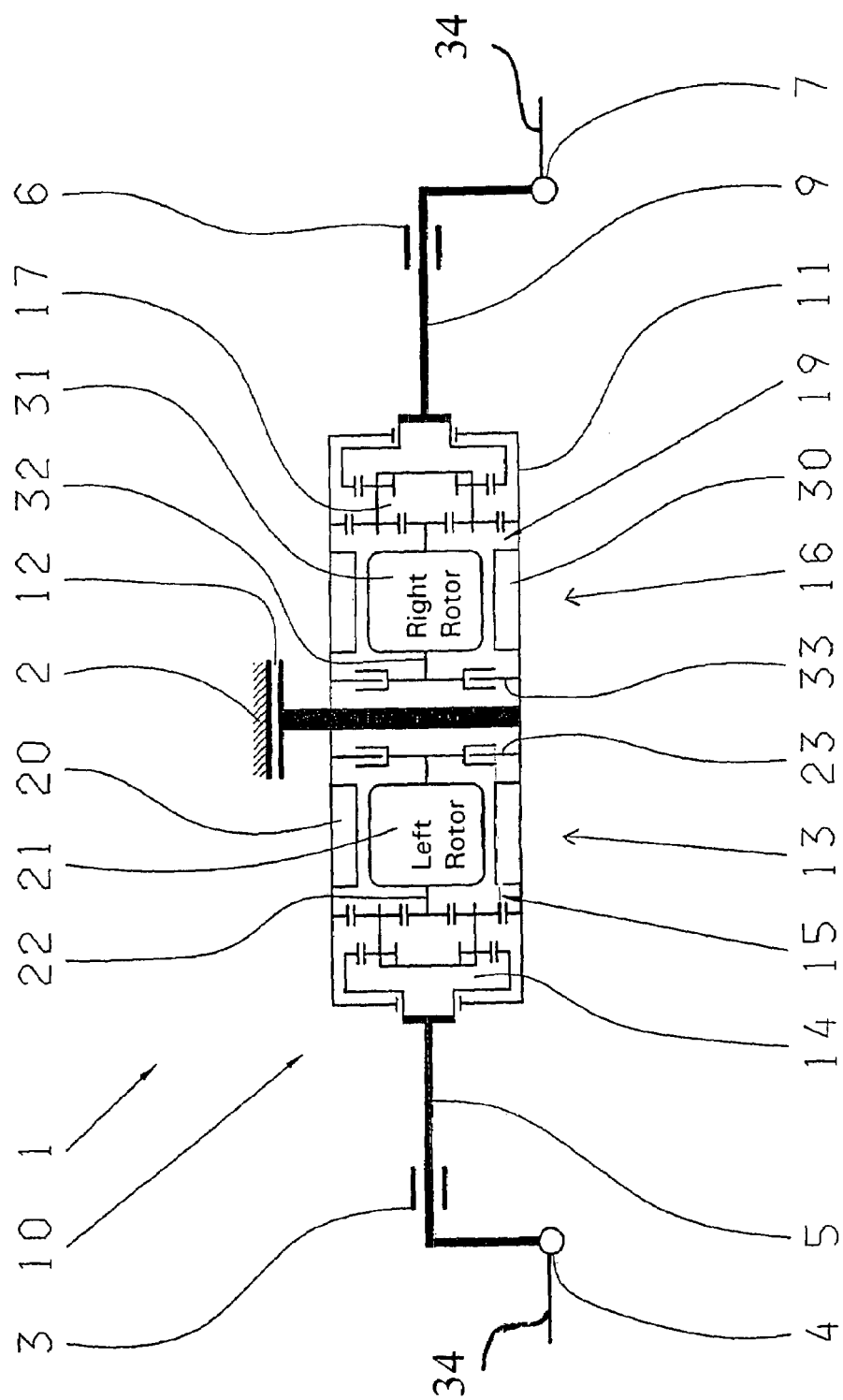
FIG. 1 shows an axial section through an inventive chassis arrangement of a vehicle according to one embodiment of the invention.

In the FIGURE, a chassis arrangement 1 is situated between a vehicle superstructure 2 and guides (not described in detail) of the two gears of a vehicle axle.

The chassis arrangement 1 has one stabilizer half 5 supported in a left stabilizer bearing 3 on the vehicle superstructure 2 and tied in a left stabilizer tying 4 to the left gear guide, and one right stabilizer half 9 supported in a right stabilizer bearing 6 on the vehicle superstructure 2 and in a right stabilizer tying 7 tied to the right gear guide, the stabilizer halves 5 and 9 being designed torsionally, yielding in a known manner.

An actuator 10 has one housing 11 non-rotatably attachable to the vehicle superstructure 2 via one actuator clutch 12. In the housing 11 is situated one left input unit 15 formed by one left electric motor 13 and one left transmission 14 and one right input 19 formed by one right electric motor 16 and one right transmission 17. The input units 15 and 19 are advantageously of similar construction and designed with mirror symmetry. The transmission 14 and 17 supported in the housing 11 acts as a reduction gear transmission and can be designed, for example, as a multi-speed planetary transmission, Wolfrom transmission, harmonic drive wobbling transmission or cycloid transmission.

The left electric motor 13 has one left stator 20 fastened in the housing 11 and one left rotor 21 which, via a left engine shaft 22 and the left transmission 14, swings the left stabilizer half 5. The left engine shaft 22 is non-rotatably attached on the other side of the left rotor 21 to the housing 11 via a left single clutch 23.

The right electric motor 16 correspondingly has one right stator 30 fastened in the housing 11 and one right rotor 31 which, via a right engine shaft 32 and the right transmission 17, swings the right stabilizer half 9. The right engine shaft 32 is non-rotatably attachable on the other side of the right rotor 31 to the housing 11 via a right single clutch 33.

The single clutches 23 and 33 thus serve optionally to block the input units 15 and 19 in the common housing 11, which housing 11 is, in turn, optionally attachable to the vehicle superstructure via the actuator clutch 12. The chassis arrangement 1 is, therefore, adjustable to at least the following positions:

A: An active stabilizer position in which the single clutches 23 and 33 and the actuator clutch 12 are disengaged. This position can be adjusted by a control device, not shown, upon detection of a reeling tendency or also already when detecting a considerable transverse acceleration. The actuator 10 acts like an active known stabilizer for exerting reaction torques or anti-reel torques. In this position, the input units 15 and 19 coupled via the housing 11 exert opposing torques upon the stabilizer halves 5 and 9. For simplification the control device can input to the input units directly opposed control signals so that they exert from the total equally strong torques.

B. A passive stabilizer position in which the single clutches 23 and 33 are engaged and the actuator clutch 12 disengaged.

Both input units 15 and 19 are blocked and passive so that the rotors 21 and 31 are not supplied with current. The chassis arrangement 1 acts like a conventional passive stabilizer. If, for example, the left gear guide with the left stabilizer tying 4 are swung upwardly, a reaction torque is transmitted to the other right stabilizer half 9 via the left stabilizer half 5, the left input unit 15, the housing 11 and the right input unit 19. The reduction ratios of the transmission 14 and 17 of similar design and switched in reverse direction balance such other.

C: The level regulation position in which the single clutches 23 and 33 are disengaged and the actuator clutch 12 is engaged so that the housing is non-rotatably tied to the vehicle superstructure 2. Each input unit 15, 19 can thus deviate the respectively tied stabilizer halves 5 and 9 relative to the vehicle superstructure 2. By equal current supply of the rotors 21, 31, the input units 15, 19 deviate the stabilizers halves 5, 9 in the same direction, i.e., both stabilizer halves 5, 9 are moved upwardly or downwardly relative to the vehicle superstructure 2 so that the stabilizer tyings are uniformly lifted or lowered and thus the whole axle 34 is lifted or lowered. A pitch compensation of the axle 34 is thus possible. The level regulation position can serve as pitch compensation especially in a dynamic operation, a level change advantageously taking place on both axles 34 in opposite directions.

REFERENCE NUMERALS 1 chassis arrangement
2 vehicle superstructure
3 left stabilizer bearing
4 left stabilizer tying
5 left stabilizer half
6 right stabilizer hearing
7 right stabilizer tying
9 right stabilizer half
10 actuator
11 housing
12 actuator clutch
13 left electric motor
14 left transmission
15 left input unit
16 right electric motor
17 right transmission
19 right input unit
20 left stator
21 left rotor
22 left engine shaft
23 left single clutch
30 right stator
31 right rotor
32 right engine shaft
33 right single clutch

The invention claimed is:

1. A chassis arrangement for a vehicle having a left stabilizer half (5), a right stabilizer half (9) and an actuator (10) for swinging the left and right stabilizer halves (5, 9), the actuator (10) comprising:
   a housing (11) connectable or connected with a vehicle superstructure (2);
   a left input unit (15) for swinging the left stabilizer half (5) relative to the housing (11);
   a right input unit (19) for swinging the right stabilizer half (9) relative to the housing (11);
   a clutch arrangement (12, 23, 33) for respectively coupling the left and the right input units (15, 19) to the housing (11); and
   the clutch arrangement having an actuator clutch (12) for one of separating the housing (11) from the vehicle superstructure (2) or non-rotatably coupling the housing (11) with the vehicle superstructure (2).

2. The chassis arrangement according to claim 1, wherein the clutch arrangement has one left single clutch (23) situated between the left input unit (15) and the housing (11) and one right single clutch (23) situated between the right input unit (19) and the housing (11).

3. The chassis arrangement according to claim 1, wherein the left and right input units (15, 19) have a same construction.

4. The chassis arrangement according to claim 1, wherein each of the left and right input units has one electric motor (13, 16) and one transmission (14, 17) situated between the electric motor (13, 16) and the respective left and right stabilizer half (5, 9).

5. The chassis arrangement according to claim 4, wherein the transmissions (14, 17) are reducing gear transmissions being one of multi-speed planetary transmission, Wolfrom transmission, harmonic drive, wobbling transmissions and cycloid transmission.

6. The chassis arrangement according to claim 1, wherein, depending on a detected drive mode of the vehicle, by control of the clutch arrangement (12, 23, 33) and of the left and right input units (15, 19), one of a plurality of following positions of the actuator (10) is adjusted:
   an active stabilizer position for an active reeling compensation;
   a level regulating position for changing the height of a vehicle axle;
   a passive stabilizer position for a passive reeling compensation.

7. The chassis arrangement according to claim 6, wherein for an active reeling compensation there is adjusted the active stabilizer position of the actuator (10) in which single clutches (23, 33) and an actuator clutch (12) are disengaged and the left and right input units (15, 19) exert upon the stabilizer halves (5, 9) opposing torques.

8. The chassis arrangement according to claim 6, wherein for a change of height of the vehicle axle, there is adjusted a level regulating position of the actuator (10) in which single clutches (23, 33) are disengaged, an actuator clutch (12) is engaged and the housing (11) non-rotatably connected with the vehicle superstructure (2) and the left and right input units (15, 19) swing in a same direction as the stabilizer halves (5, 9) moving upwardly or downwardly relative to the vehicle superstructure 2 so that the stabilizer tyings (4, 7) and hence the vehicle axle are uniformly lifted or lowered and a pitch compensation is facilitated.

9. The chassis arrangement according to claim 6, wherein for a passive reeling compensation there is adjusted the passive stabilizer position in which the single clutches (23, 33) are engaged, an actuator clutch (12) disengaged and the left and right input units (15, 19) are passive.

10. A suspension system for a vehicle having a stabilizer to compensate for vehicle pitch and roll of a vehicle superstructure (2), the stabilizer comprising:
   an actuator;
   a left stabilizer bar extending from the actuator to a tie-in connection with a vehicle axle;
   a right stabilizer bar extending from the actuator to a tie-in connection with the vehicle axle;
   a housing supporting the actuator and the actuator further comprising;
     a left input unit for (15) for rotating the left stabilizer bar (5) relative to the housing (11);

a right input unit (19) for rotating the right stabilizer bar (9) relative to the housing (11); and a clutch arrangement interposed between the housing and the left and right stabilizer bars and the clutch arrangement further comprising an actuator clutch (12) interposed between the housing (11) and the vehicle superstructure (2) for non-rotatably coupling the housing (11) with the vehicle superstructure (2).

11. The suspension system for a vehicle according to claim 10, wherein the clutch arrangement further comprises a left clutch (23) situated between the left input unit (15) and the housing (11) and a right clutch (33) situated between the right input unit (19) and the housing (11).

12. The suspension system for a vehicle according to claim 11, wherein each of the left and right input units comprises an electric motor (13, 16) disposed between the respective left and right clutches and the respective left and right stabilizer bar for rotating the left and right stabilizer bars relative to the housing (11).

13. The suspension system for a vehicle according to claim 12 wherein each of the left and right input units further comprises a reducing transmission (14, 17) situated between the electric motor (13, 16) and the respective left and right stabilizer bar (5, 9).

* * * * *